US011228670B2

(12) United States Patent
Fuji

(10) Patent No.: US 11,228,670 B2
(45) Date of Patent: Jan. 18, 2022

(54) WIRELESS COMMUNICATION DEVICE AND WIRELESS COMMUNICATION METHOD

(71) Applicant: FUJITSU COMPONENT LIMITED, Tokyo (JP)

(72) Inventor: Koichiro Fuji, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/688,154

(22) Filed: Nov. 19, 2019

(65) Prior Publication Data

US 2020/0236204 A1 Jul. 23, 2020

(30) Foreign Application Priority Data

Jan. 18, 2019 (JP) .............................. JP2019-007315

(51) Int. Cl.
*H04B 17/15* (2015.01)
*H04W 24/02* (2009.01)
*H04M 1/02* (2006.01)
*H02J 7/35* (2006.01)

(52) U.S. Cl.
CPC ............. *H04M 1/0262* (2013.01); *H02J 7/35* (2013.01)

(58) Field of Classification Search
CPC ...... H04M 1/0262; H04M 1/73; H04M 24/02; H04B 7/0426; H04B 10/07955; H04B 17/15; H02J 7/35
See application file for complete search history.

(56) References Cited

U.S. PATENT DOCUMENTS

| | | | | |
|---|---|---|---|---|
| 9,692,644 | B2 * | 6/2017 | Hui ...................... | H04L 41/147 |
| 10,136,274 | B2 * | 11/2018 | Lindqvist ............. | H04W 24/08 |
| 2003/0169006 | A1 * | 9/2003 | Allen ....................... | H02P 7/06 |
| | | | | 318/442 |
| 2013/0009595 | A1 * | 1/2013 | Brown ...................... | F22B 1/28 |
| | | | | 320/108 |
| 2015/0324696 | A1 * | 11/2015 | Hirschbold ............. | G06N 5/04 |
| | | | | 706/46 |
| 2016/0345081 | A1 * | 11/2016 | Yamada ................... | H04Q 9/00 |
| 2017/0133866 | A1 * | 5/2017 | Itoh ................... | H02J 13/00028 |
| 2017/0279304 | A1 * | 9/2017 | Furukawa ............ | H02J 7/0068 |
| 2017/0311222 | A1 | 10/2017 | Yamashita et al. | |
| 2018/0221662 | A1 * | 8/2018 | Devcic ............... | A61N 1/36038 |

FOREIGN PATENT DOCUMENTS

| | | | | | |
|---|---|---|---|---|---|
| JP | | 2016-95649 | | 5/2016 | |
| JP | | 2017-208939 | | 11/2017 | |
| JP | WO | 2018/066370 | * | 12/2018 | ............. H02J 13/00 |
| WO | WO | 2016/113884 A1 | | 7/2016 | |

* cited by examiner

*Primary Examiner* — Andrew Wendell
(74) *Attorney, Agent, or Firm* — Staas & Halsey, LLP

(57) ABSTRACT

A wireless communication device includes: a power storage element configured to store an electric power generated by a power generation element; and a processor configured to: calculate a power storage speed of the power storage element from a temporal change in a voltage of the power storage element; estimate a power generation amount of the power generation element based on a power consumption corresponding to a setting of wireless communication, and the power storage speed; and perform the setting of wireless communication according to the estimated power generation amount.

4 Claims, 5 Drawing Sheets

FIG. 2A

TABLE 130

|  | TRANSMISSION STRENGTH (dBm) | | | | | |
| --- | --- | --- | --- | --- | --- | --- |
|  | −16 | −12 | −8 | −4 | 0 | 4 |
| TRANS-MISSION INTERVAL (msec) 100 | w0 | w1 | w2 | w3 | w4 | w5 |
| 200 | w6 | w7 | w8 | w9 | w10 | w11 |
| 500 | w12 | w13 | w14 | w15 | w16 | w17 |
| 1000 | w18 | w19 | w20 | w21 | w22 | w23 |
| 2000 | w24 | w25 | w26 | w27 | w28 | w29 |
| 5000 | w30 | w31 | w32 | w33 | w34 | w35 |
| 10000 | w36 | w37 | w38 | w39 | w40 | w41 |

FIG. 2B

COMMUNICATION SETTING INFORMATION 131

| TRANSMISSION INTERVAL (msec) | 10000 |
| --- | --- |
| TRANSMISSION STRENGTH (dBm) | −16 |

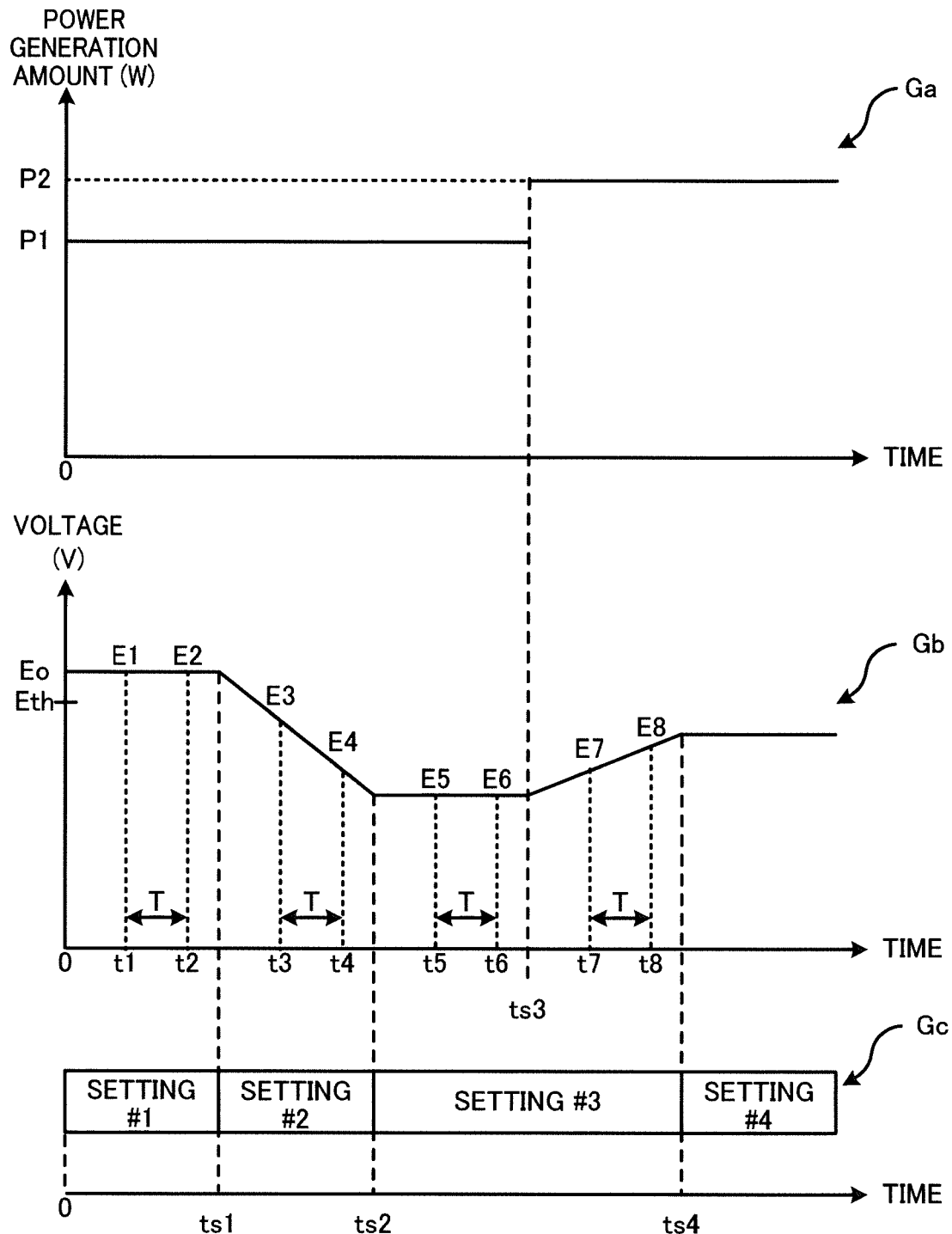

WIRELESS COMMUNICATION DEVICE AND WIRELESS COMMUNICATION METHOD

CROSS-REFERENCE TO RELATED APPLICATION

This application is based upon and claims the benefit of priority of the prior Japanese Patent Application No. 2019-007315 filed on Jan. 18, 2019, the entire contents of which are incorporated herein by reference.

FIELD

A certain aspect of the embodiments is related to a wireless communication device and a wireless communication method.

BACKGROUND

A beacon terminal is attracting attention with the spread of Internet Of Things (IoT) related technology.

An energy harvesting element such as a solar cell and a piezoelectric element using energy harvesting technology is used as a power supply means for the beacon terminal, so that an installation place of the beacon terminal is not limited to a place where an electric power can be supplied, and battery exchange is not required (e.g. see Patent Document 1: Japanese Laid-open Patent Publication No. 2017-208939, and Patent Document 2: Japanese Laid-open Patent Publication No. 2016-95649).

SUMMARY

According to an aspect of the present invention, there is provided a wireless communication device including: a power storage element configured to store an electric power generated by a power generation element; and a processor configured to: calculate a power storage speed of the power storage element from a temporal change in a voltage of the power storage element; estimate a power generation amount of the power generation element based on a power consumption corresponding to a setting of wireless communication, and the power storage speed; and perform the setting of wireless communication according to the estimated power generation amount.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A is a diagram illustrating an example of a power consumption table;

FIG. 2B is a diagram illustrating an example of communication setting information;

FIG. 3 is a diagram illustrating an example of the operation of the beacon terminal;

DESCRIPTION OF EMBODIMENTS

The electric power generated by the energy harvesting element varies according to a surrounding environment as well as aging degradation. The Patent Document 1 discloses that the beacon terminal operating with a solar cell controls a transmission interval and a strength of a radio wave according to an illuminance detected by an optical sensor. However, since the beacon terminal is required to be downsized, it is difficult to mount the optical sensor on the beacon. It is also difficult to mount a current sensor detecting an output current of the energy harvesting element on the beacon terminal for the same reason.

The Patent Document 2 discloses that a wireless device that operates with a power generation element generating the electric power by vibration sets a power consumption amount of wireless transmission according to an electromotive force of the power generation element. However, a certain time is required until a voltage of a capacitor is saturated in order to detect the electromotive force, and it is therefore difficult to change the setting in a timely manner according to a change in the environment.

A wireless communication device and a wireless communication method according to the present embodiment can change the setting of wireless communication in a timely manner according to a change in the environment.

Figure 1:
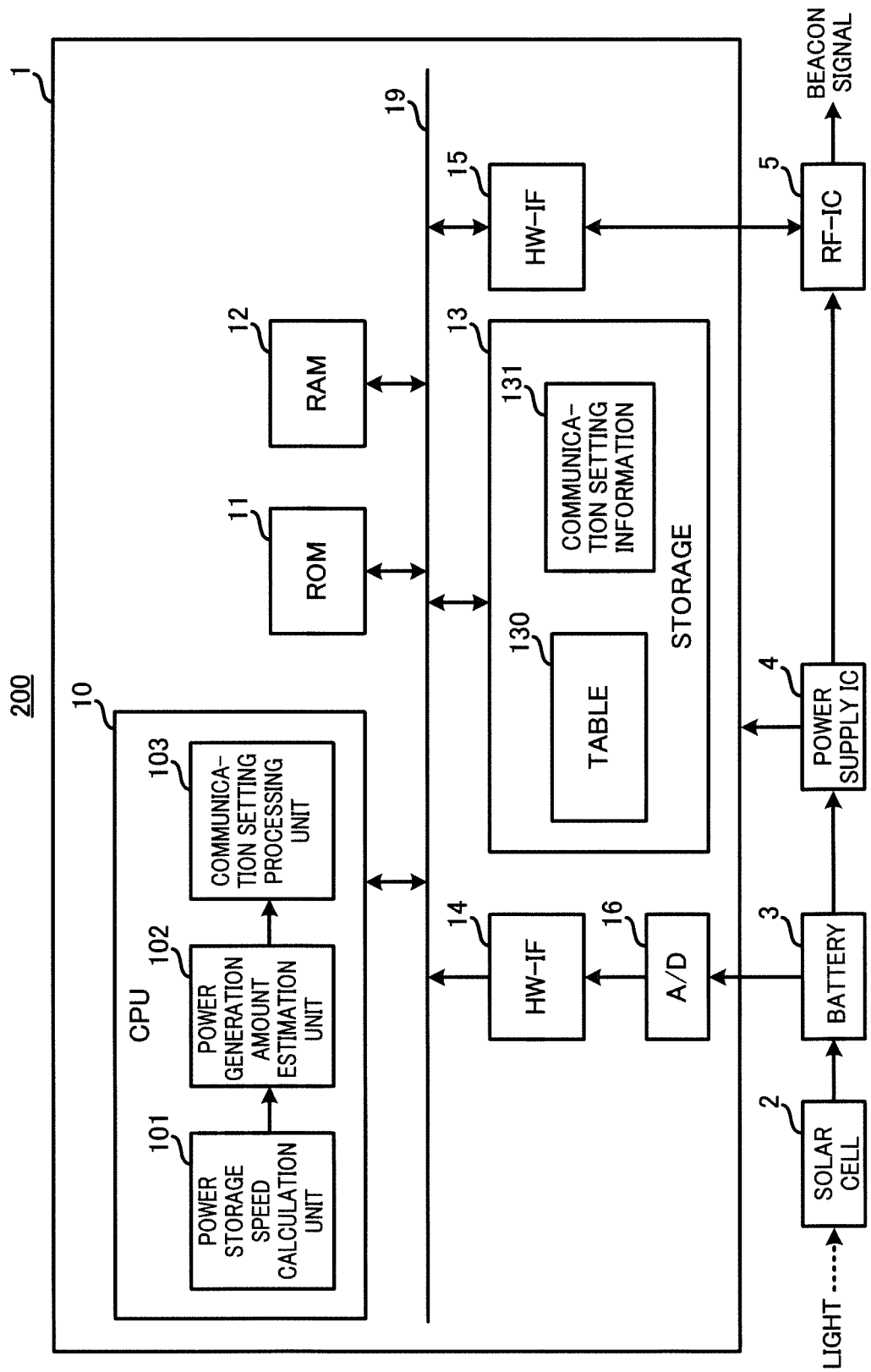
FIG. 1 is a configuration diagram illustrating an example of a beacon terminal.

FIG. 1 illustrates the configuration of a beacon terminal 200. The beacon terminal 200 is an example of the wireless communication device, and performs wireless communication by supplying an electric power from a solar cell 2. The beacon terminal 200 can provide various services in cooperation with a mobile communication terminal such as a smartphone by transmitting a beacon signal including position information or content information such as a coupon.

The beacon terminal 200 includes a microcontroller (hereinafter referred to as "a controller") 1, the solar cell 2, a battery 3, a power supply integrated circuit (IC) 4, and a radio frequency (RF)-IC 5. The solar cell 2 receives sunlight or illumination light to generate an electric power. Although the solar cell 2 is an example of a power generation element, the power generation element is not limited to the solar cell, and may be various power generation elements such as a piezoelectric element, a thermoelectric conversion element, or a non-contact power generation element that generates the electric power by a radio wave like a smartphone.

When the solar cell 2 is used, the beacon terminal 200 can operate as long as it is installed in a place where light can reach. When the piezoelectric element is used, the beacon terminal 200 can operate as long as it is installed in a place where vibration is generated by a vibration source such as a machine tool. When the thermoelectric conversion element is used, the beacon terminal 200 can operate as long as it is installed in a place where a temperature difference is generated by a heat source.

Since an energy harvesting element is used, the installation place of the beacon terminal is not limited to a place where a power source can be supplied, and a time and labor for battery exchange is unnecessary. However, the electric power generated by the energy harvesting element varies according to a surrounding environment as well as aging degradation. For this reason, in the present embodiment, the controller 1 estimates a power generation amount of the solar cell 2 and changes a communication setting of the RF-IC 5 so as to get the power consumption corresponding to the power generation amount.

The battery 3 is an example of a power storage element, and stores an electric power generated by the solar cell 2. The controller 1 detects the voltage of the battery 3 and determines a power storage amount of the battery 3. Examples of the battery 3 include a multilayer ceramic capacitor, a supercapacitor, and so on. However, other power storage elements may be used as long as the power storage amount can be detected as a voltage.

The power supply IC 4 supplies the electric power from the battery 3 to the controller 1 and the RF-IC 5. The power supply IC 4 includes, for example, a DC-DC (Direct Current) converter and the like, and generates drive voltages for the controller 1 and the RF-IC 5.

The RF-IC 5 is a wireless communication circuit, and transmits a beacon signal based on the communication setting from the controller 1. The communication setting includes a transmission interval and a transmission strength of the beacon signal. The beacon terminal can change the transmission interval and the transmission strength according to the communication setting. The longer the transmission interval or the greater the transmission strength, the easier the reception of the beacon signal. The communication setting is an example of a setting for wireless communication. The communication setting may include any one of the transmission interval and the transmission strength, or may include other settings other than them.

The controller 1 includes a central processing unit (CPU) 10, a read only memory (ROM) 11, a random access memory (RAM) 12, a storage 13, hardware interfaces (HW-IF) 14 and 15, and an analog-digital (A/D) converter 16. The CPU 10 is connected to the ROM 11, the RAM 12, the storage 13, and the HW-IFs 14 and 15 via a bus 19.

The ROM 11 stores a program for driving the CPU 10. The RAM 12 functions as a working memory for the CPU 10.

The A/D converter 16 converts the voltage of the battery 3 from an analog value to a digital value, and outputs the digital value to the HW-IF 14. The CPU 10 acquires the digital value of the voltage from the HW-IF 14 in order to calculate a power storage speed of the battery 3.

The HW-IF 15 relays communication between the CPU 10 and the RF-IC 5. The CPU 10 executes the communication setting to the RF-IC 5 via the HW-IF 15.

The storage 13 stores a table 130 in which power consumptions are recorded, and communication setting information 131.

FIG. 2A illustrates an example of the table 130, and FIG. 2B illustrates an example of the communication setting information 131. A correspondence relationship between the communication settings and the power consumptions of the RF-IC 5 is registered in the table 130. The power consumptions of the RF-IC 5 are an example of power consumptions by wireless communication, and the storage 13 is an example of a storage that stores the correspondence relationship between the communication settings and the power consumptions.

The table 130 stores information indicating power consumptions w0 to w41 (W: watt) corresponding to combinations of the transmission intervals (msec) and the transmission strengths (dBm) of the beacon signal. When the transmission interval is 500 msec and the transmission strength is −4 dBm, the power consumption is w15 W. The information stored in the table 130 is generated in advance based on experiments or simulations, and written in the storage 13.

The communication setting information 131 indicates the transmission interval (msec) and the transmission strength (dBm) of the beacon signal set to the RF-IC 5. When the CPU 10 sets the transmission interval (msec) and the transmission strength (dBm) to the RF-IC 5 or changes them, the CPU 10 updates the communication setting information 131.

The CPU 10 sets a maximum transmission interval 10000 msec and a minimum transmission strength −16 dBm included in the table 130 to the RF-IC 5 as an initial setting. At the time of startup of the RF-IC 5, the power consumption becomes a minimum.

The CPU 10 acquires the power consumption corresponding to the communication setting from the table 130 with reference to the table 130 based on the communication setting information 131. For example, when the communication setting information 131 indicates the transmission interval 10000 msec and the transmission strength −16 dBm, the CPU 10 acquires the power consumption w0 (W).

The CPU 10 calculates the power storage speed of the battery 3 from a temporal change in the voltage of the battery 3, and estimates the power generation amount of the solar cell 2 from the power storage speed, and the power consumption corresponding to the communication setting at that time. Moreover, the CPU 10 compares the estimated power generation amount with the power consumptions w0 to w41 in the table 130, and reads the transmission interval and the transmission strength corresponding to the power generation amount from the table 130 based on a comparison result.

Therefore, a processing load of the CPU 10 can be reduced and the processing speed can be improved as compared with a case where the power consumption or a set of the transmission interval and the transmission strength is calculated without using the table 130.

When the CPU 10 reads the program from the ROM 11, the CPU 10 forms a power storage speed calculation unit (hereinafter referred to as "a calculation unit") 101, a power generation amount estimation unit (hereinafter referred to as "an estimation unit") 102 and a communication setting processing unit (hereinafter referred to as "a processing unit") 103, as functions. The calculation unit 101, the estimation unit 102, and the processing unit 103 may be configured by hardware such as a field programmable gate array (FPGA) or an application specified integrated circuit (ASIC) instead of the program.

The calculation unit 101 detects the voltage of the battery 3 via the HW-IF 14. The calculation unit 101 calculates the power storage speed of the battery 3 from the temporal change of the battery voltage. The calculation unit 101 detects the battery voltage at constant time intervals (for example, 1 second).

$$Wt = (1/2) \times C \times E^2 \quad (1)$$

$$\Delta Wt = Wt(t1) - Wt(t0) = (1/2) \times C \times \{E(t1)^2 - E(t0)^2\} \quad (2)$$

An electric power Wt stored in the battery 3 is calculated from a formula (1). Wherein C is a capacity of the battery 3, and E is a voltage of the battery 3.

Since a change amount $\Delta Wt$ in the electric power Wt between times t0 and t1 is a difference between an electric power Wt (t0) at the time t0 and an electric power Wt (t1) at the time t1, it is calculated from a formula (2). Wherein E(t0) is a voltage E at the time t0, and E(t1) is a voltage E at the time t1.

The calculation unit 101 detects the voltages E(t0) and E(t1) of the battery 3 at the times t0 and t1, and calculates the change amount ΔWt stored in the battery 3 from the formula (2). Thereby, the calculation unit 101 calculates the power storage speed (ΔWt) in which a difference between the times t0 and t1 is set as unit time. The unit time is a detection interval of the voltage E, and is arbitrarily set.

Since the calculation unit 101 calculates the power storage speed from the temporal change in the voltage E of the battery 3, it can detect a degree of consumption of the battery 3 by simple calculation. The calculation unit 101 notifies the estimation unit 102 of the power storage speed.

The estimation unit 102 estimates the power generation amount of the solar cell 2 based on the power consumption corresponding to the communication setting and the power storage speed calculated by the calculation unit 101. The estimation unit 102 acquires the power consumption corresponding to the communication setting from the table 130 with reference to the table 130 based on the communication setting information 131. For this reason, the estimation unit 102 can rapidly acquire the power consumption with a low load, without performing a calculation process.

The estimation unit 102 adds the power consumption acquired from the table 130 and the power storage speed to calculate the power generation amount of the solar cell 2. When the power storage speed is 100 μW/sec and the power consumption is 100 μW, the solar cell 2 supplies an electric power of 100 μW to the RF-IC 5 and the controller 1 while charging the battery 3 with the electric power of 100 μW per one second. Therefore, the total of the power generation amount is 200 μW (=100+100).

The estimation unit 102 can calculate the power generation amount of the solar cell 2 in the same manner as described above even when the battery 3 is discharged. When the power storage speed is −20 μW/sec and the power consumption is 100 μW, the battery 3 discharges the electric power of 20 μW per one second, and the electric power of 100 μW is supplied to the RF-IC 5 and the controller 1. Therefore, a difference of 80 μW (=100−20) is the power generation amount of the solar cell 2. Also in this case, the total of the power consumption and the power storage speed becomes the power generation amount.

The estimation unit 102 estimates the power generation amount of the solar cell 2 based on the power storage speed, and the power consumption corresponding to the communication setting. Therefore, the estimation unit 102 can highly accurately estimate the power generation amount from a communication state of the RF-IC 5 and a power storage state of the battery 3 with a low load process without using an optical sensor or the like. The estimation unit 102 notifies the processing unit 103 of the estimated power generation amount.

The processing unit 103 performs the communication setting on the RF-IC 5 via the HW-IF 15. As described above, the processing unit 103 sets the maximum transmission interval 10000 msec and the minimum transmission strength −16 dBm included in the table 130 to the RF-IC 5 as the initial setting.

The processing unit 103 is an example of a setting unit, and changes the communication setting according to the estimated power generation amount of the solar cell 2. The processing unit 103 compares the power consumptions w0 to w41 in the table 130 with the estimated power generation amount, and selects a communication setting corresponding to the estimated power generation amount from the table 130 based on a result of the comparison.

For example, the processing unit 103 selects the transmission interval and the transmission strength corresponding to the power consumption that is less than the estimated power generation amount and closest to the estimated power generation amount among the power consumptions w0 to w41 from the table 130, and sets the selected transmission interval and the selected transmission strength to the RF-IC 5. For this reason, the communication setting is appropriately changed so that the power consumption of the RF-IC 5 matches the estimated power generation amount.

FIG. 3 is a diagram illustrating an example of the operation of the beacon terminal. A code Ga indicates a change in the power generation amount generated by the solar cell 2, a code Gb indicates a change in the voltage of the battery 3, and a code Gc indicates a change in the communication setting of the RF-IC 5.

It is assumed that time 0 is a time point when the power storage for the entire capacity of the battery 3 is completed and the beacon terminal starts the operation. At this time, the voltage of the battery 3 is a saturation voltage Eo. The processing unit 103 sets the communication setting of the RF-IC 5 as a setting #1 of the initial setting. The setting #1 is a setting corresponding to the minimum power consumption in the table 130. For this reason, inability to transmit the beacon signal due to power shortage is avoided at the time of startup of the RF-IC 5.

The calculation unit 101 detects a voltage E1 at the time t1 and a voltage E2 at the time t2 after T seconds. Since a difference (E2−E1) between the voltages E1 and E2 at this time is less than a threshold D of the voltage change, and the voltage E2 is greater than a threshold Eth, the calculation unit 101 determines that the battery 3 is a saturation state, and requests the processing unit 103 to change the communication setting.

Since the power generation amount of the solar cell 2 at this time is unclear, the processing unit 103 selects a setting #2 that consumes an electric power more than the setting #1 from the table 130, and changes the communication setting to the setting #2 at a time ts1. Thereby, the power consumption increases, and the voltage of the battery 3 decreases. After the communication setting is changed to the setting #2, the voltage detection stops for a certain time so as to maintain the communication setting.

Then, the calculation unit 101 detects a voltage E3 at a time t3 and a voltage E4 at a time t4 after T seconds to calculate the power storage speed. The estimation unit 102 estimates the power generation amount of the solar cell 2 based on the power storage speed, and the power consumption corresponding to the communication setting.

At this time, the power storage speed is a negative value, and the power consumption is larger than the power generation amount. Therefore, the processing unit 103 sets the communication setting to a setting #3 that consumes an electric power less than the setting #2 so that the power consumption becomes less than the power generation amount at a time ts2. Therefore, the power generation amount and the power consumption are balanced, and the voltage of the battery 3 is maintained substantially constant. At this time, the communication setting may be set so that the power consumption is a maximum value within the range of the power generation amount. After the communication setting is changed to the setting #3, the voltage detection stops for a certain time so as to maintain the communication setting.

Then, the calculation unit 101 detects a voltage E5 at a time t5 and a voltage E6 at a time t6 after T seconds. Here, since the power generation amount and the power consumption are balanced, the voltages E5 and E6 are substantially constant values. Since a difference (E6−E5) between the voltages E5 and E6 at this time is less than the threshold D, and the voltage E6 is less than the threshold Eth, the calculation unit 101 determines whether the battery 3 is not the saturation state. Therefore, the communication setting is maintained without being changed.

Thereafter, at a time ts3, for example, the power generation amount of the solar cell 2 increases from P1 (W) to P2 (W) due to a change in weather. When the power generation amount is more than the power consumption, the voltage of the battery 3 increases.

The calculation unit 101 detects a voltage E7 at a time t7 and a voltage E8 at a time t8 after T seconds to calculate the power storage speed. The estimation unit 102 estimates the power generation amount based on the power storage speed, and the power consumption corresponding to the communication setting.

At this time, the power storage speed is a positive value, and the power consumption is less than the power generation amount. Therefore, the processing unit 103 sets the communication setting to a setting #4 that consumes an electric power more than the setting #3 so that the power consumption is a maximum value within the range of the power generation amount at a time ts4. Therefore, the power generation amount and the power consumption are balanced, and the voltage of the battery 3 after the time ts4 is maintained substantially constant.

Thus, the beacon terminal 200 calculates the power storage speed from the temporal change in the voltage of the battery 3, estimates the power generation amount from the power storage speed and the power consumption, and changes the communication setting according to the estimated power generation amount. Therefore, the beacon terminal 200 can change the communication setting of the RF-IC 5 in a timely manner even if the power generation amount of the solar cell 2 changes according to changes in the surrounding environment.

Figure 4:
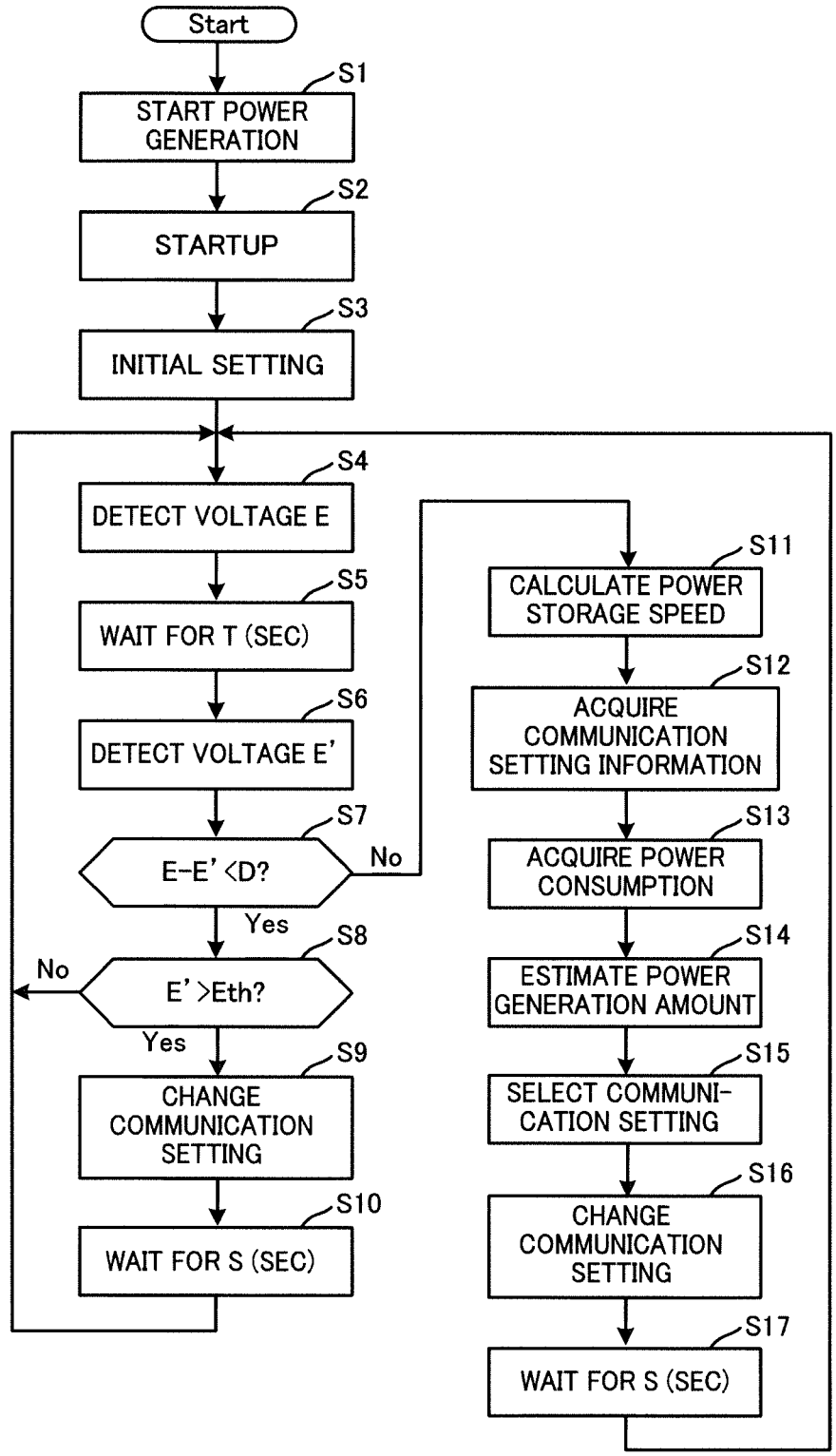
FIG. 4 is a flowchart illustrating an example of the operation of the beacon terminal.

FIG. 4 is a flowchart illustrating an example of the operation of the beacon terminal. The operation of the beacon terminal 200 is an example of the wireless communication method.

When the beacon terminal 200 is put on a place where light is received, the solar cell 2 starts power generation (S1). When the power storage for the entire capacity of the battery 3 is completed, the controller 1, the RF-IC 5 and the like start (S2). The processing unit 103 performs the initial setting on the RF-IC 5 (S3).

The calculation unit 101 detects a voltage E of the battery 3 (S4). The calculation unit 101 waits for T seconds (S5), and then detects a voltage E' of the battery 3 (S6).

The calculation unit 101 compares an absolute value of a difference (E'−E) between the voltages E and E' with the threshold D (S7). When the absolute value of the difference (E'−E) is smaller than the threshold D (YES in S7), the calculation unit 101 compares the voltage E' with the threshold Eth because the power generation amount and the power consumption are balanced (S8). It should be noted that the threshold value D is set to a small value to the extent that the voltages E and E' are regarded as constant values, and the threshold Eth is set to a value close to the saturation voltage Eo.

When the voltage E' is equal to or less than the threshold Eth (NO in S8), the processing unit 103 does not change the communication setting, the processes of S4 and subsequent steps are performed again. When the voltage E' is more than the threshold Eth (YES in S8), the processing unit 103 determines that the voltage of the battery 3 is substantially the saturation voltage Eo and there is a margin in the capacity of the battery 3, and changes the communication setting so that power consumption increases (S9). Thereafter, after waiting for S seconds so that the communication setting is maintained (S10), the processes of S4 and subsequent steps are performed again.

When the voltage of the battery 3 temporally changes within a certain range (the range of the threshold D) equal to or higher than the threshold Eth as described above, the processing unit 103 changes the communication setting so that the power consumption increases in accordance with the temporal change. Therefore, when the processing unit 103 detects that the voltage of the battery 3 is the saturation voltage Eo, the processing unit 103 determines that there are margins in the capacity of the battery 3 and the power generation amount by the solar cell 2, and can appropriately change the communication setting.

When the difference (E'−E) is equal to or more than the threshold D (NO in S7), the calculation unit 101 calculates the power storage speed of the battery 3 from the temporal change in the voltages E and E' (S11). The estimation unit 102 acquires the communication setting information 131 from the storage 13 (S12), and acquires the power consumption corresponding to the communication setting from the power consumption table 130 in the storage 13 (S13). The estimation unit 102 estimates the power generation amount of the solar cell 2 based on the power consumption and the power storage speed (S14).

The processing unit 103 compares the power generation amount with the power consumption in the table 130, and selects a communication setting from the table 130 based on a result of the comparison (S15). The processing unit 103 changes the communication setting of the RF-IC 5 based on a result of the selection (S16). Thereafter, after waiting for S seconds so that the communication setting is maintained (S17), the processes of S4 and subsequent steps are performed again. In this way, the beacon terminal 200 operates.

Figure 5A:
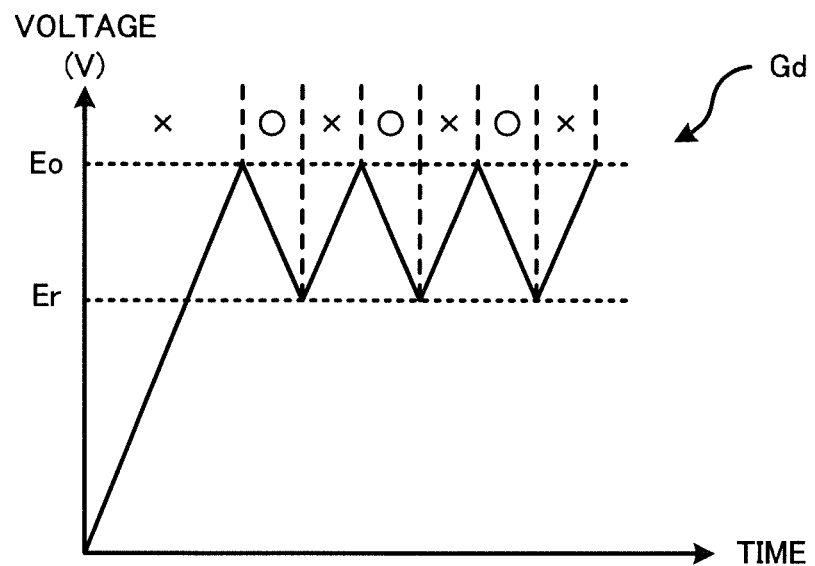
FIG. 5A is a diagram illustrating an example of the operation of the beacon terminal according to a comparative example.
Figure 5B:
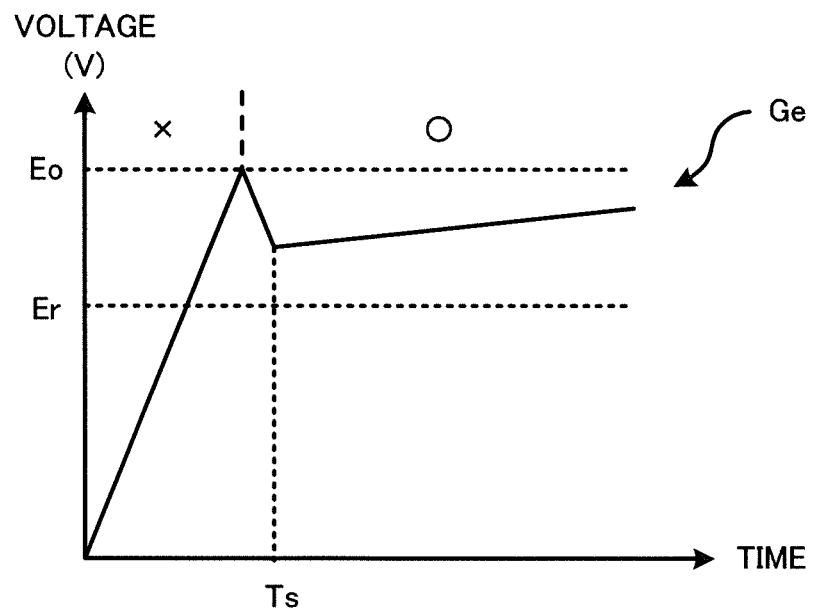
FIG. 5B is a diagram illustrating an example of the operation of the beacon terminal according to an embodiment.

FIG. 5A illustrates the operation of the beacon terminal according to a comparative example, and FIG. 5B illustrates the operation of the beacon terminal according to the present embodiment. A code Gd indicates a change in voltage of the battery 3 of the comparative example, and a code Ge indicates a change in voltage of the battery 3 of the present embodiment. In FIGS. 5A and 5B, marks "◯" represent periods during which the beacon signal can be transmitted, and marks "×" represent periods during which the beacon signal cannot be transmitted. A lower limit voltage Er is a minimum voltage in which the beacon signal can be transmitted.

In the beacon terminal of the comparative example, the controller 1 does not change the communication setting of the RF-IC 5 according to the power generation amount of the solar cell 2. The beacon terminal can transmit the beacon signal after the voltage of the battery 3 reaches the saturation voltage Eo. However, when the voltage reduces due to the signal transmission and falls below the lower limit voltage Er, the transmission of the beacon signal is stopped. After the voltage of the battery 3 increases and reaches the saturation voltage Eo by charging the solar cell 2, the transmission of the beacon signal is resumed. Thus, since the voltage of the battery 3 repeats increasing and decreasing, the periods during which the beacon signal can be transmitted and the periods during which the beacon signal cannot be transmitted are also repeated. For this reason, the transmission of the beacon signal is interrupted and intermittent every time the voltage falls below the lower limit voltage Er.

On the other hand, the beacon terminal 200 of the present embodiment estimates the power generation amount of the solar cell 2 from the power storage speed and power consumption of the battery 3, and changes the communication setting of the RF-IC 5 according to the power generation amount. For this reason, after the voltage of the battery 3 reaches the saturation voltage Eo and the transmission of the beacon signal becomes possible, the beacon terminal 200 determines the power storage speed from the temporal change in voltage at a time Ts during which the voltage is decreasing, and changes the communication setting so that the power consumption of the RF-IC 5 reduces. Therefore, the beacon terminal 200 can increase the power storage voltage of the battery 3 by changing the communication setting before the voltage reaches the lower limit voltage Er. Accordingly, the beacon terminal 200 suppresses interruption of the transmission of the beacon signal unlike the comparative example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A wireless communication device comprising:
   a communicator that performs wireless communication with an external device;
   a power storage element configured to store an electric power generated by a power generation element;
   a processor configured to:
      calculate a power storage speed of the power storage element from a temporal change in a voltage of the power storage element,
      estimate a power generation amount of the power generation element based on a power consumption corresponding to a setting of the communicator, and the power storage speed, and
      perform the setting of the communicator according to the estimated power generation amount; and
   a storage that stores information indicating a plurality of sets of transmission intervals and strengths of a signal output from the communicator and a plurality of power consumptions corresponding to the plurality of sets;
   wherein the processor sets a set of transmission interval and strength corresponding to a power consumption less than and closest to the estimated power generation amount among the plurality of power consumptions, to the communicator.

2. The wireless communication device as claimed in claim 1,
   wherein the storage stores a correspondence relationship between settings of the wireless communication and power consumptions; and
   wherein the processor,
      acquires the power consumption corresponding to the setting of the wireless communication from the storage,
      compares the estimated power generation amount with the power consumptions stored in the storage, and
      selects a changed setting of the wireless communication from the settings of the wireless communication stored in the storage based on a result of the comparison.

3. The wireless communication device as claimed in claim 1, wherein
   the processor changes the setting of the wireless communication according to the temporal change in the voltage of the power storage element.

4. A wireless communication method comprising:
   storing an electric power generated by a power generation element into a power storage element;
   calculating a power storage speed of the power storage element from a temporal change in a voltage of the power storage element;
   estimating a power generation amount of the power generation element based on a power consumption corresponding to a setting of wireless communication, and the power storage speed;
   changing the setting of wireless communication according to the estimated power generation amount; and
   storing, in a storage, information indicating a plurality of sets of transmission intervals and strengths of a signal output by the wireless communication and a plurality of power consumptions corresponding to the plurality of sets;
   wherein the setting of wireless communication is changed to a set of transmission interval and strength corresponding to a power consumption less than and closest to the estimated power generation amount among the plurality of power consumptions.

* * * * *